(12) United States Patent
Ju

(10) Patent No.: US 12,472,071 B2
(45) Date of Patent: Nov. 18, 2025

(54) APPARATUS FOR MEASURING SIZE OF CUP FOR HIP ARTHROPLASTY

(71) Applicant: IMEDICOM CO., LTD., Gunpo-si (KR)

(72) Inventor: Don Soo Ju, Gunpo-si (KR)

(73) Assignee: IMEDICOM CO., LTD., Gunpo-si (KR)

( * ) Notice: Subject to any disclaimer, the term of this patent is extended or adjusted under 35 U.S.C. 154(b) by 516 days.

(21) Appl. No.: 17/923,516

(22) PCT Filed: Apr. 22, 2021

(86) PCT No.: PCT/KR2021/005085
§ 371 (c)(1),
(2) Date: Nov. 4, 2022

(87) PCT Pub. No.: WO2021/256695
PCT Pub. Date: Dec. 23, 2021

(65) Prior Publication Data
US 2023/0181325 A1     Jun. 15, 2023

(30) Foreign Application Priority Data
Jun. 16, 2020    (KR) .................. 10-2020-0073181

(51) Int. Cl.
*A61F 2/32*     (2006.01)
*A61F 2/46*     (2006.01)

(52) U.S. Cl.
CPC .............. *A61F 2/32* (2013.01); *A61F 2/4609* (2013.01); *A61F 2/4657* (2013.01)

(58) Field of Classification Search
CPC ................. A61F 2/4657; A61F 2/4609; A61F 2002/4658; A61F 2002/4659; A61B 90/06
See application file for complete search history.

(56) References Cited

U.S. PATENT DOCUMENTS

| 4,127,112 | A | * | 11/1978 | Sherlock | ................ | G01B 3/166 |
| | | | | | | 606/205 |
| 5,070,623 | A | * | 12/1991 | Barnes | ................... | G01B 3/166 |
| | | | | | | 33/807 |
| 5,210,955 | A | * | 5/1993 | Lewis | ...................... | G01B 5/12 |
| | | | | | | 33/558.4 |
| 7,509,754 | B2 | * | 3/2009 | Hu | ......................... | G01B 3/166 |
| | | | | | | 33/783 |

(Continued)

*Primary Examiner* — Anu Ramana
(74) *Attorney, Agent, or Firm* — Rabin & Berdo, P.C.

(57) ABSTRACT

Apparatus for measuring size of a cup for hip arthroplasty according to the present disclosure includes a scale plate marked with a scale to measure size, a first leg portion fixed to one end of the scale plate, and a second leg portion slidably moved relatively to the first leg portion along the scale plate, in which the second leg portion is marked with reading line. First and second jaws for contacting the cup are provided with 180° rotational symmetry on ends of the first and second leg portions, respectively. Central portions of the first and second jaws are bent to protrude in direction in which the first and second leg portions are farther away from each other, so that when contacting inner diameter of the cup, the jaws form one-point contact with the cup, and when contacting outer diameter of the cup, form two-point contact with the cup.

9 Claims, 13 Drawing Sheets

(56) References Cited

U.S. PATENT DOCUMENTS 8,006,405 B2 * 8/2011 Hu ............... G01B 3/166
  33/679.1
8,257,362 B2 * 9/2012 Casutt ............. A61B 90/06
  606/102

* cited by examiner

APPARATUS FOR MEASURING SIZE OF CUP FOR HIP ARTHROPLASTY

TECHNICAL FIELD

The present disclosure relates to an apparatus for measuring a size of a cup for hip arthroplasty.

BACKGROUND ART

A prosthetic hip is an artificial joint inserted into the hip joint of a patient who cannot use the hip joint due to damage or wear of the hip joint to serve as a joint to continuously maintain the patient's normal activities.

The prosthetic hip is largely divided into three parts including first, a hemispherical acetabular cup having a liner inserted into the acetabular region of the pelvis and functioning as a bearing of the femoral ball head between the femoral ball head and the acetabular cup on an inner circumferential surface, second, a stem that is fit in the femur; and lastly, a hemispherical femoral head that replaces the femoral head.

Meanwhile, the prosthetic hip is worn out as it is used for a long time. Particularly, the acetabular cup rubbing against the head has a high incidence of wear due to continuous use of the joint, and as the wear continues, in the severe cases, osteolysis occurs around the acetabular region where the acetabular cup is inserted. Therefore, it is necessary to remove the previously inserted acetabular cup from the acetabular bone and place a new acetabular cup instead.

Accordingly, when performing hip arthroplasty, it is necessary to measure the size of the liner and the acetabular cup (hereinafter, both is collectively referred to as a "cup") as illustrated in FIG. 12A and FIG. 12B, and a size measuring apparatus in the related art includes a plurality of liner plates having different sizes as illustrated in FIG. 10A and FIG. 10B.

Using this, a user selects a liner plate appearing to match the approximate size estimated by his or her eyes and tries measuring the size, but there is a problem in that the user has to repeat selecting and putting the liner plate into the liner and the acetabular cup one by one several times. Since a plurality of liner plates having various size values are provided in a bundle, there also is a problem in that it is heavy. In addition, when folding the measuring apparatus after use, the liner plates interfere with each other, which causes inconvenience in handling.

In addition, when measuring an outer diameter of the cup, several attempts are required, such as putting the cup one by one into a measuring unit corresponding to the expected size using a related cup size measuring apparatus as illustrated in FIG. 11, and if there is no measuring part corresponding to size of the cup, it is not possible to measure the outer diameter of the cup.

DETAILED DESCRIPTION OF INVENTION

Technical Problem

The present disclosure is provided to solve the problems of the related art described above, and it is an object of the present disclosure to provide an apparatus for measuring a size of a cup for hip arthroplasty, which can measure a size, i.e., inner and outer diameters of a liner and an acetabular cup.

Technical Solution

In order to achieve the above-mentioned object, an apparatus for measuring a size of a cup for hip arthroplasty according to an embodiment of the present disclosure may include a scale plate marked with a scale to measure a size, a first leg portion fixed to one end of the scale plate, and a second leg portion slidably movable relative to the first leg portion along the scale plate, in which the second leg portion may be marked with a reading line, a first jaw and a second jaw for contacting the cup are provided with 180° rotational symmetry on ends of the first leg portion and the second leg portion, respectively, and central portions of the first jaw and the second jaw may be bent to protrude in a direction in which the first leg portion and the second leg portion are farther away from each other, so that when contacting an inner diameter of the cup, the first jaw and the second jaw may form an one-point contact with the cup, and when contacting an outer diameter of the cup, the first jaw and the second jaw may form a two-point contact with the cup.

Further, the scale on the scale plate may include a scale for measuring an outer diameter of the cup and a scale for measuring an inner diameter of the cup, and the scale for measuring an outer diameter may be disposed on one side of the scale plate, and the scale for measuring an inner diameter may be disposed on the other side of the scale plate.

In addition, a zero point of the scale for measuring an outer diameter may be spaced apart from a zero point of the scale for measuring an inner diameter in the direction in which the scale plate is extended by a predetermined distance.

In addition, the apparatus may include support plates for contacting a rim of the cup, which may be provided on upper portions of the first jaw and the second jaw, respectively.

In addition, the apparatus may further include a guide portion provided at the first leg portion, in which the guide portion may be passed through the second leg portion and contacts the second leg portion, and the guide portion may be extended in the same direction as the scale plate in parallel.

In addition, the first leg portion and the second leg portion may be provided with a through hole, respectively, into which the user's finger may be inserted.

In addition, the second leg portion may include a slide portion including a cavity portion for wedge-coupling with the scale plate, in which cross sections of the cavity portion and the scale plate may be in a trapezoidal shape and correspond to each other.

In addition, an identifier indicating the scale for measuring an outer diameter and an identifier indicating the scale for measuring an inner diameter may be marked on the slide portion at positions adjacent to one side and the other side of the scale plate.

In addition, the predetermined distance may be a difference between outer and inner diameter values of a virtual cup that can be measured in an initial state in which the first leg portion and the second leg portion are not slidably moved relatively to each other.

Advantageous Effects

The apparatus for measuring a size of a cup for hip arthroplasty according to the embodiments of the present disclosure having the configuration described above has following effects.

Since the scale plate includes both the scale for measuring an outer diameter of the cup and the scale for measuring an inner diameter of the cup, inner and outer diameter values can be easily checked.

Further, the upper portions of the first and second jaws are provided with each of the support plates contacting (caught by) the rim of the cup, so that contacting a lower portion of the rim of the cup when measuring size of the cup and providing incorrect reading of outer diameter value and inner diameter value can be prevented.

Further, the first jaw and the second jaw are formed in a so-called arrow head shape in which their central portions are bent to protrude outwardly, with planar portions being extended from the central portions to both sides such that, when contacting an outer diameter of the cup, the first and second jaws form the two-point contacts and when contacting an inner diameter of the cup, form the one-point contact, and accordingly, accurate inner and outer diameter values can be obtained.

Further, user can easily measure the size of the cup with only one hand.

Meanwhile, it goes without saying that the present disclosure includes other effects, although not explicitly stated, that can be expected from the configuration described above.

BEST MODE FOR EMBODYING INVENTION

Hereinafter, preferred embodiments of the present disclosure will be described in detail with reference to the accompanying drawings, which will be readily apparent to those skilled in the art to which the present disclosure pertains. However, it will be understood that the present disclosure can be implemented in various other different forms and should not be construed as being limited to certain examples described herein.

Figure 1:
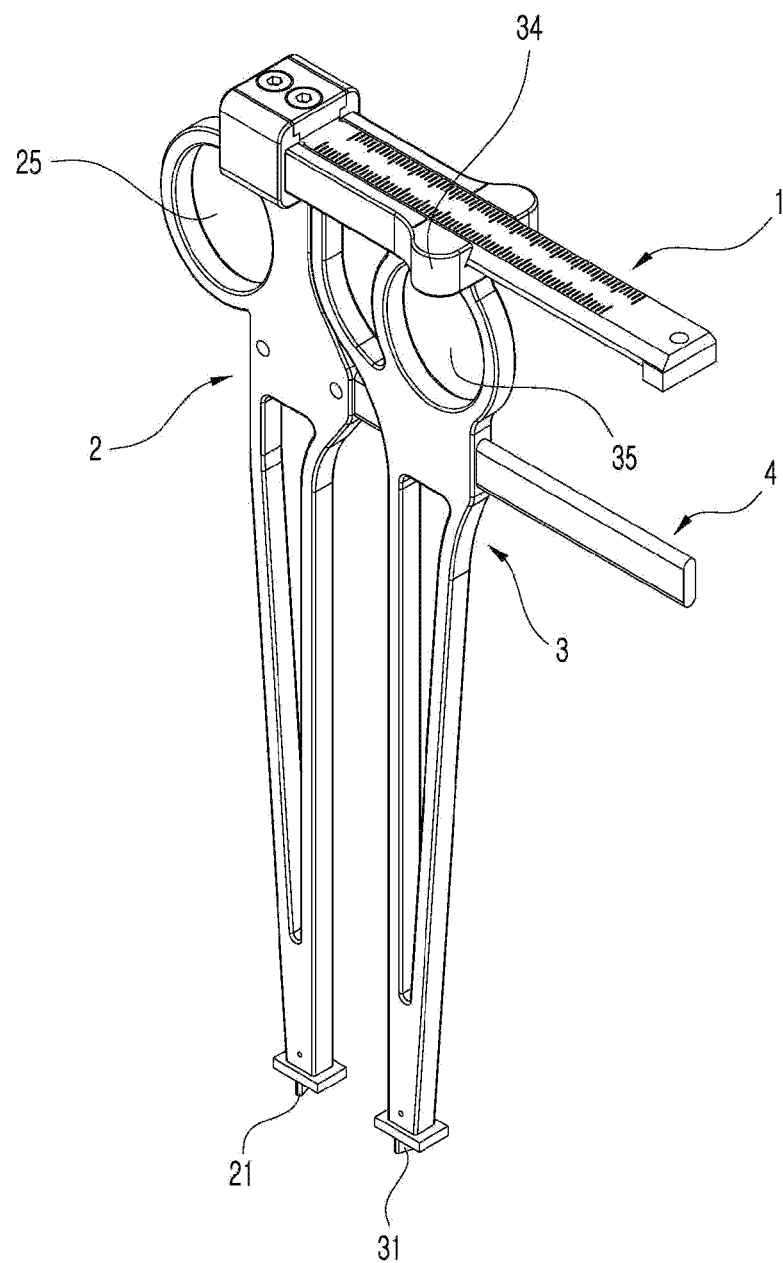
FIG. 1 is an apparatus for measuring a size of a cup for hip arthroplasty according to an embodiment of the present disclosure.
Figure 2:
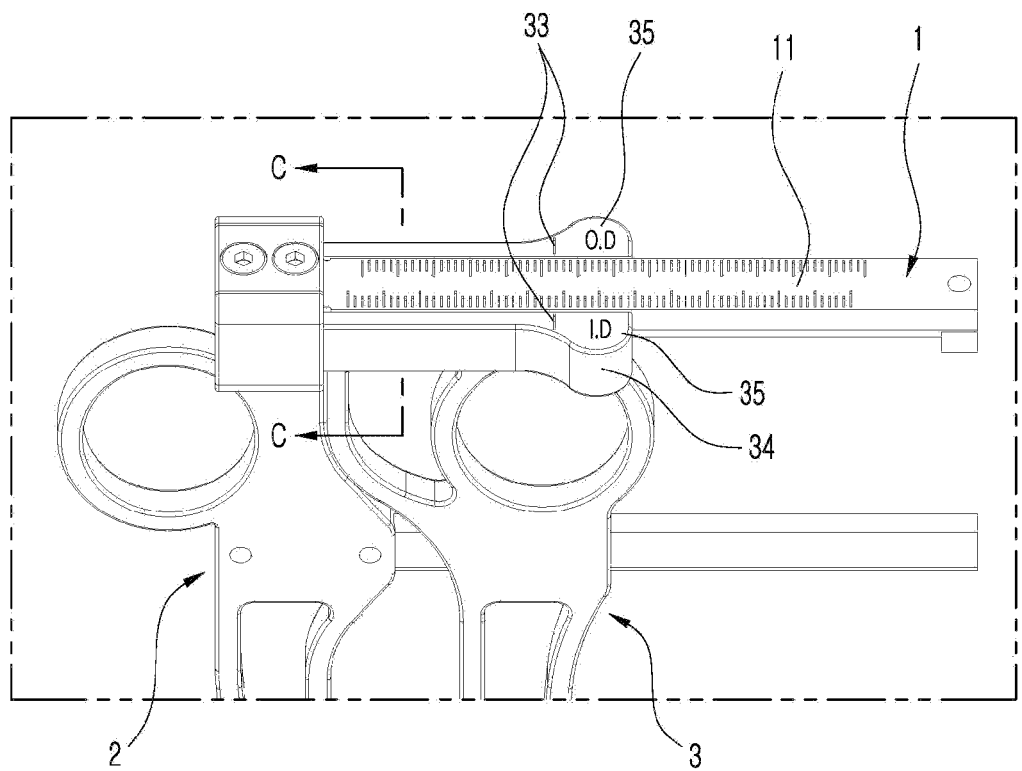
FIG. 2 shows a main configuration of an upper portion of the measuring apparatus of FIG. 1.

FIG. 1 illustrates an apparatus (hereinafter referred to as the "measuring apparatus") for measuring a size of a cup for hip arthroplasty according to an embodiment of the present disclosure. For reference, a liner and an acetabular cup may be referred to herein as a cup. FIG. 2 is an enlarged view of a main configuration of an upper portion of the measuring apparatus of FIG. 1.

As shown in FIGS. 1 and 2, the measuring apparatus includes a scale plate 1 marked with a scale 11 for measuring the size of the cup, a first leg portion 2 fixed to one end (based on FIG. 2, the left end of the scale plate) of the scale plate 1, and a second leg portion 3 slidably moved along the scale plate 1 in a direction of being relatively farther away from or close to the first leg portion 2, in which the second leg portion 3 is marked with a reading line 33 thereon.

Figure 7:
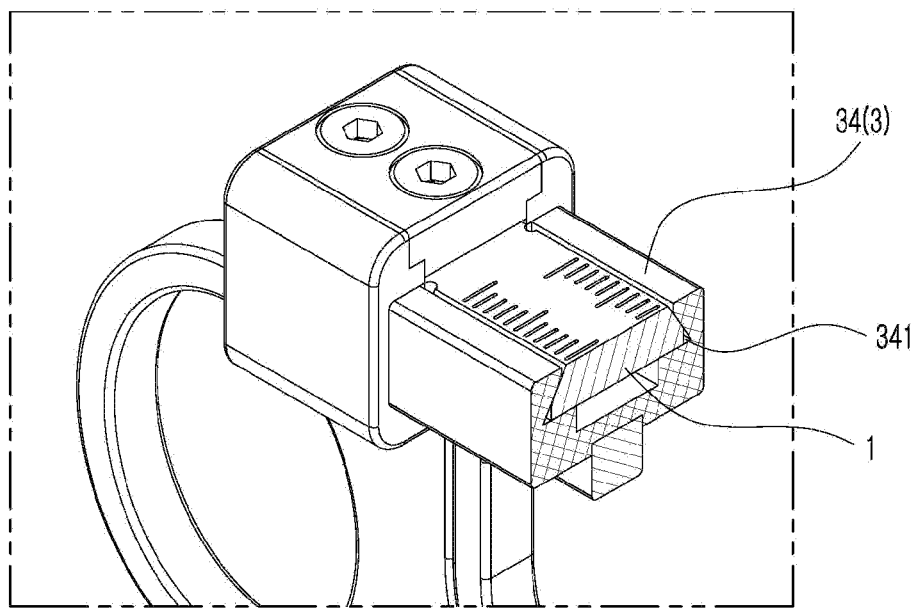
FIG. 7 is a cross-sectional view taken in a direction C-C of FIG. 1.

As illustrated in FIG. 7, the second leg portion 3 is provided with a slide portion 34 including a cavity portion 341 for wedge-coupling with the scale plate 1, in which the cross sections of the cavity portion and the scale plate 1 have an appropriately trapezoidal shape and correspond to each other.

At the ends of the first leg portion 2 and the second leg portion 3, there are provided a first jaw 21 and a second jaw 31 to contact the cup and measure the inner and outer diameters thereof, in which the first and second jaws 21 and 31 face each other with 180° rotational symmetry.

Figure 3:
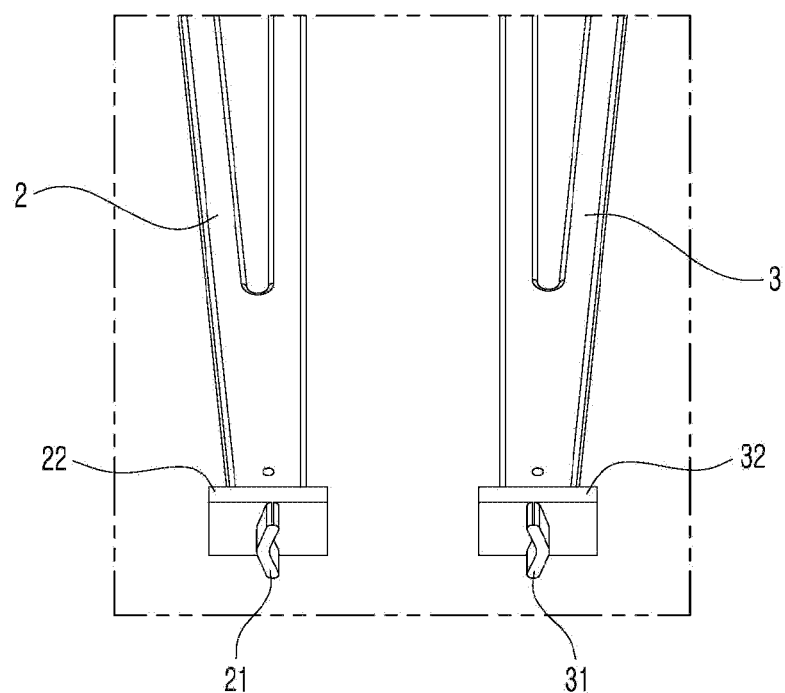
FIG. 3 shows a main configuration of a lower portion of the measuring apparatus of FIG. 1.
Figure 4:
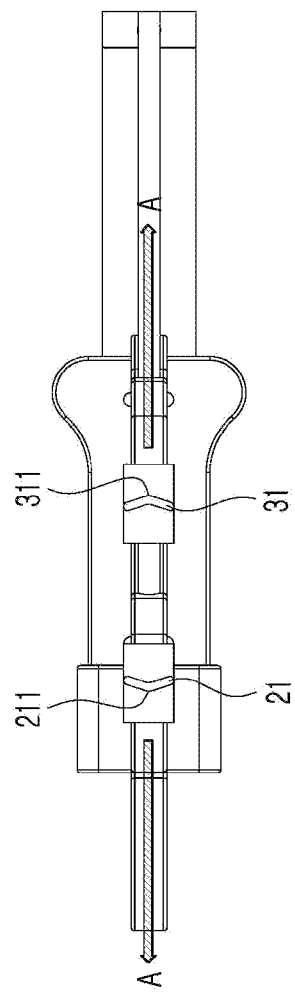
FIG. 4 is a bottom view of the measuring apparatus of FIG. 1 seen from below.

As illustrated in FIGS. 3 and 4, the first jaw 21 and the second jaw 31 are formed in a so-called arrow head shape with central portions 211 and 311 thereof bent to protrude in a direction (A direction of FIG. 4) in which the first leg portion 2 and the second leg portion 3 are farther away from each other. Further, portions in the shape of flat plate are extended from the center portions 211 and 311 to both sides (based on FIG. 4, in the vertical direction).

Figure 5A:
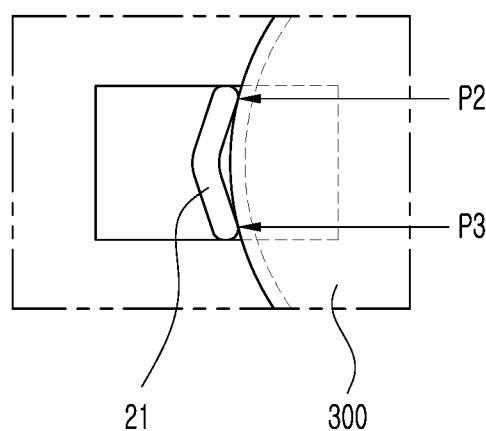
FIG. 5A is a schematic view of a jaw of the measuring apparatus of FIG. 1 contacting an outer diameter of the cup.
Figure 5B:
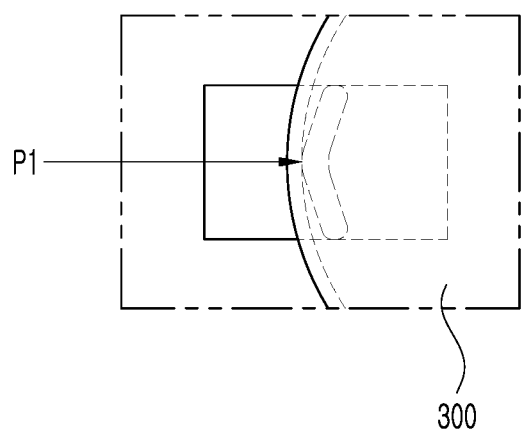
FIG. 5B is a schematic view of the jaw contacting an inner diameter of the cup.

Accordingly, as illustrated in FIG. 5A, when the measuring apparatus contacts the outer diameter of the cup 300, the first jaw 21 and the second jaw 31 form a two-point contact (P2, P3) on a surface of the cup 300, and when the measuring apparatus contacts the inner diameter of the cup 300, form a single point contact (P1) on the cup 300.

Meanwhile, as illustrated in FIG. 2, the scale 11 on the scale plate 1 includes both a scale 111 for measuring an outer diameter of the cup and a scale 112 for measuring an inner diameter of the cup. Specifically, the scale 111 for measuring an outer diameter may be disposed on one side (based on FIG. 2, the upper side) of the scale plate 1, and the scale 112 for measuring an inner diameter may be disposed on the other side (based on FIG. 2, the lower side) of the scale plate 1. In this regard, for user convenience, it is preferable to mark, on the slide portion 34 of the second leg portion 3, an identifier 35, i.e., 'OD' (Outer Diameter) indicating the scale for measuring an outer diameter, and 'ID' (Inner Diameter) indicating the scale for measuring an inner diameter at positions adjacent to one and the other sides of the scale plate 1.

Figure 6:
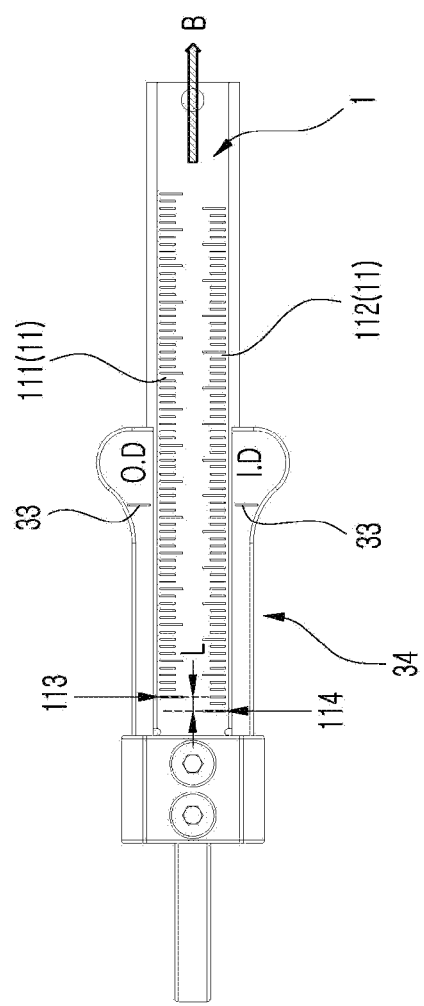
FIG. 6 is a plan view illustrating a configuration of a scale plate 1 and a slide portion 34 of the measuring apparatus of FIG. 1.

As illustrated in FIG. 6, a zero point 113 of the scale 111 for measuring an outer diameter is spaced apart from a zero point 114 of the scale 112 for measuring an inner diameter in a direction B in which the scale plate 1 is extended by a predetermined distance L. The predetermined distance L is a gap generated due to the positions of the zero points 113 and 114 of the scale offset by comparing thickness of the first jaw (second jaw) and a measurement result of the cup. For example, the predetermined distance L may be a difference between an outer diameter value and an inner diameter value of a virtual cup that can be measured in an initial state (see FIG. 1) in which the first leg portion 2 and the second leg portion 3 are not slidably moved relatively to each other.

Referring to FIGS. 3 and 8, support plates 22 and 32 for contacting a rim 301 of the cup 300 may be provided on upper portions of the first jaw 21 and the second jaw 31, respectively. Accordingly, when measuring the size of the cup, the first jaw 21 and the second jaw 31 are positioned on the outer and inner diameters of the cup. That is, without the support plates 22 and 32, the first jaw 21 and the second jaw 31 may contact a lower portion of the rim 301 of the cup 300 and provide incorrect reading of the outer and inner diameter values, and this can be prevented with the support plates 22 and 32.

As illustrated in FIG. 1, a guide portion 4 is further provided on the first leg portion 2, in which the guide portion 4 passes through and contacts the second leg portion 3, and the guide portion 4 is extended in the same direction as the scale plate 1 in parallel. With this guide portion 4, the second leg portion 3 can be slidably moved relatively more stably from the first leg portion 2.

Meanwhile, the first leg portion 2 and the second leg portion 3 may respectively include through holes 25 and 35 into which the user's finger is inserted. With these holes, user can easily measure the size of the cup while moving the first leg portion 2 and the second leg portion 3 close to or farther away from each other with only one hand.

Hereinbelow, a method of using an apparatus for measuring a size of a cup for hip arthroplasty according to an embodiment of the present disclosure having the configuration described above will be described.

Figure 8A:
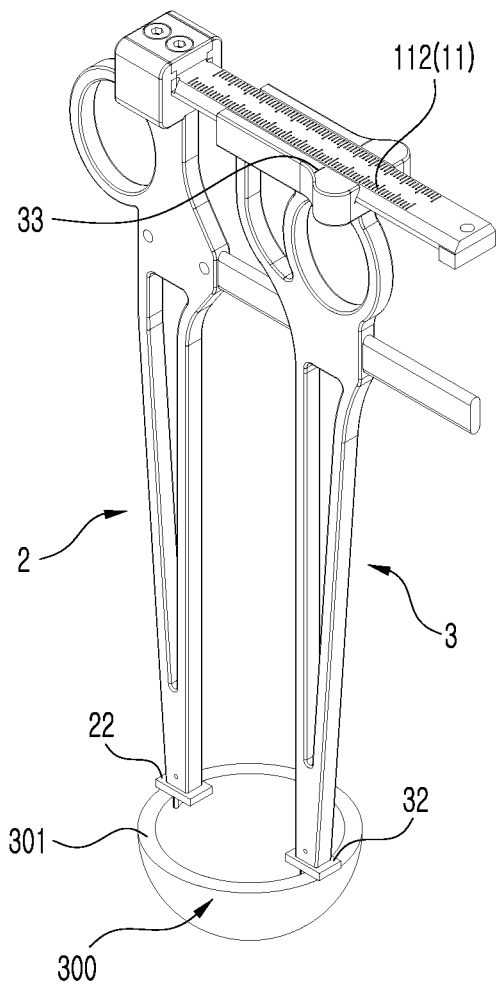
FIG. 8A is a schematic view illustrating how an inner diameter of the cup is measured using the measuring apparatus of FIG. 1.

When measuring the inner diameter of the cup, as illustrated in FIG. 8A, the first leg portion 2 and the second leg portion 3 are positioned inside the cup while being maintained as close as possible to each other.

Then, the second leg portion 3 is slidably moved in a direction of being relatively farther away from the first leg portion 2, and the support plates 22 and 32 are placed on the rim 301 of the cup 300.

Finally, a value may be read from a position where the reading line 33 on the side of the scale 112 for measuring an inner diameter is placed.

Figure 8B:
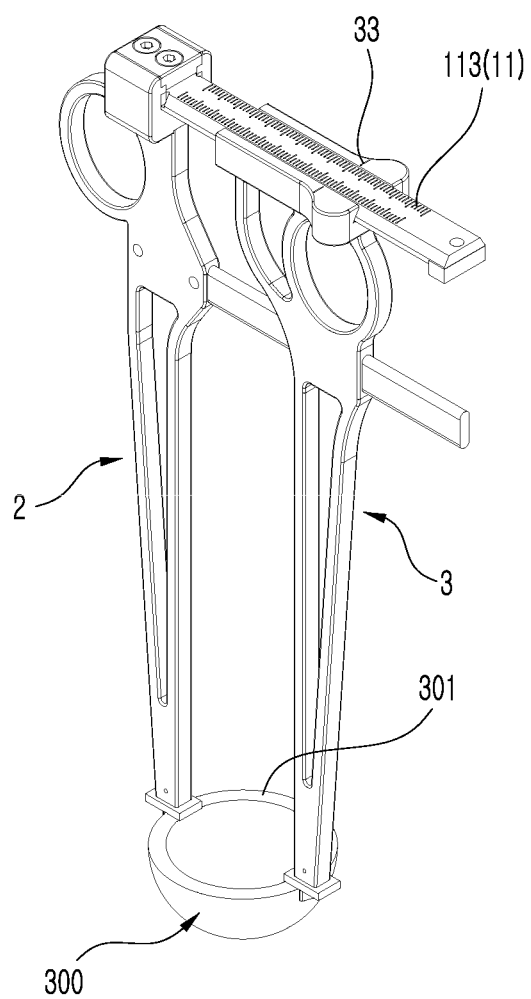
FIG. 8B is a schematic view illustrating how an outer diameter of the cup is measured.
Figure 9:
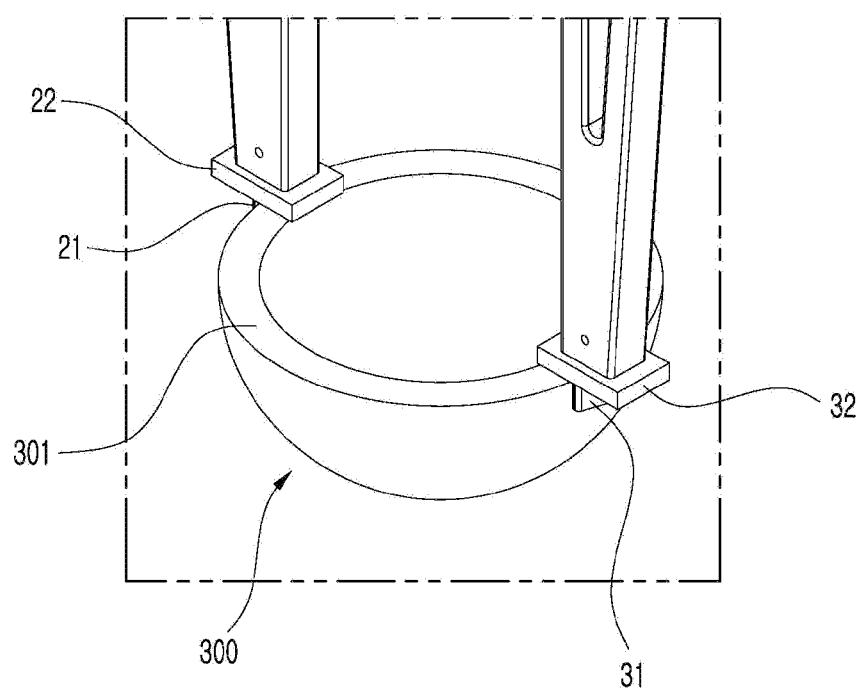
FIG. 9 is an enlarged view of the measuring apparatus of FIG. 1 when measuring the outer diameter of the cup.
Figure 10A:
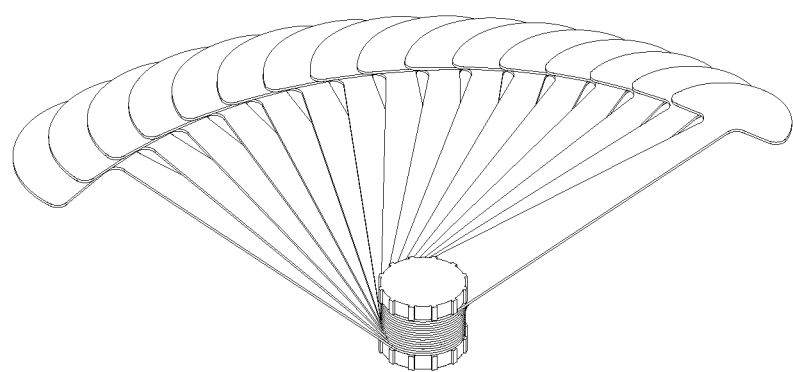
FIG. 10A and FIG. 10B are examples of a related measuring apparatus for measuring an inner diameter of the cup size for hip arthroplasty.
Figure 10B:
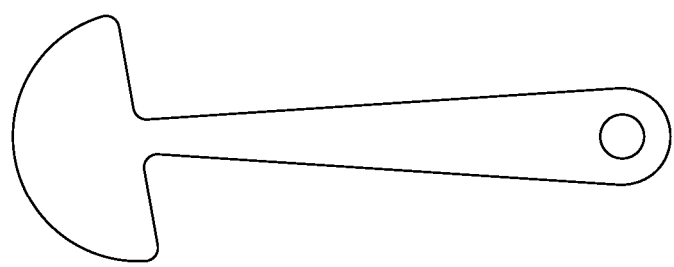
Figure 11:
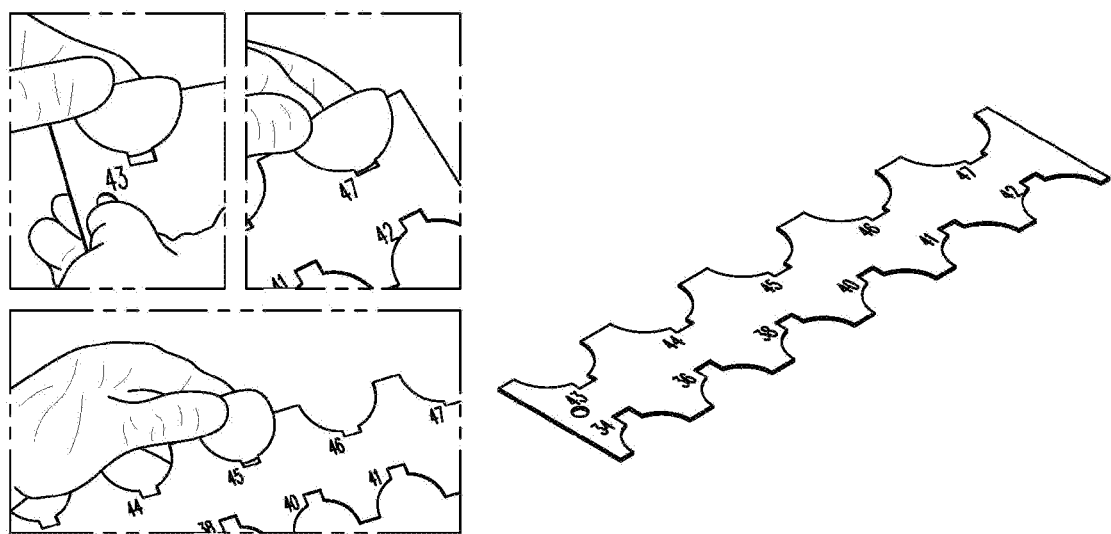
FIG. 11 is an example of a related measuring apparatus for measuring an outer diameter of a size of a related cup for hip arthroplasty.
Figure 12A:
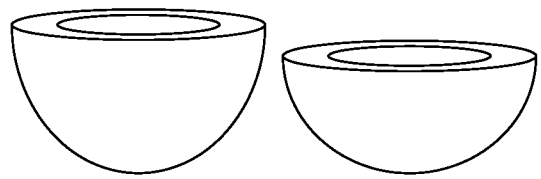
FIG. 12A shows an example of a liner.
Figure 12B:
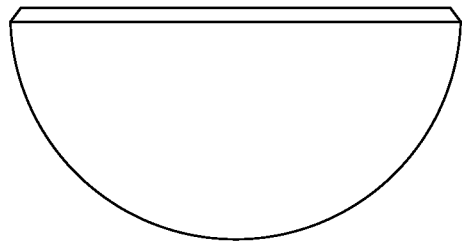
FIG. 12B shows an example of an acetabular cup.

When measuring the outer diameter of the cup, as illustrated in FIG. 8B, the first leg portion 2 and the second leg portion 3 are positioned outside the cup while being maintained as far as possible from each other.

Then, the second leg portion 3 is slidably moved in a direction of being relatively close to the first leg portion 2, and the support plates 22 and 32 are placed on the rim 301 of the cup 300.

Finally, a value may be read from a position where the reading line 33 on the side of the scale 113 for measuring an outer diameter is placed.

Although the present disclosure has been described in connection with some examples herein, the present disclosure should not be limited to those examples only, and various other changes and modifications made by those skilled in the art from the basic concept of the disclosure are also within the scope of the claims appended herein.

INDUSTRIAL APPLICABILITY

The measuring apparatus according to the present disclosure can be used for the hip arthroplasty.

The invention claimed is:

1. An apparatus for measuring a size of a cup for hip arthroplasty, comprising:
a scale plate marked with a scale to measure the size of the cup for hip arthroplasty;
a first leg portion fixed to one end of the scale plate;
a second leg portion slidably movable relative to the first leg portion along the scale plate, the second leg portion marked with a reading line; and
a first jaw and a second jaw, each having 180° rotational symmetry, wherein the first jaw is provided on a distal end of the first leg portion opposite a proximal end of the first leg portion fixed to the scale plate and the second jaw is provided on a distal end of the second leg portion opposite a proximal end of the second leg portion, and
central portions of the first jaw and the second jaw are bent to protrude in a direction such that the first leg portion and the second leg portion are farther away from each other, so that when contacting an inner diameter of the cup, the first jaw and the second jaw form a one-point contact with the cup, and when contacting an outer diameter of the cup, the first jaw and the second jaw form a two-point contact with the cup.

2. The apparatus according to claim 1, wherein the scale on the scale plate includes a scale for measuring the outer diameter of the cup and a scale for measuring the inner diameter of the cup, and
the scale for measuring the outer diameter is disposed on one side of the scale plate, and the scale for measuring the inner diameter is disposed on another side of the scale plate.

3. The apparatus according to claim 2, wherein a zero point of the scale for measuring the outer diameter of the cup is offset from a zero point of the scale for measuring the inner diameter of the cup by a predetermined distance along a direction in which the scale plate is extended.

4. The apparatus according to claim 3, wherein the predetermined distance is a difference between outer and inner diameter values of a virtual cup that can be measured in an initial state in which the first leg portion and the second leg portion are not slidably moved relatively to each other.

5. The apparatus according to claim 1, further comprising support plates located above the first jaw and the second jaw, respectively, each configured to contact an upper rim of the cup.

6. The apparatus according to claim 1, further comprising a guide portion provided on the first leg portion, wherein the guide portion passes through the second leg portion and contacts the second leg portion, the guide portion extending along an axis parallel to a longitudinal axis of the scale plate.

7. The apparatus according to claim 6, wherein each of the first leg portion and the second leg portion are provided with a through hole, respectively, into which a user's finger is insertable.

8. The apparatus according to claim 1, wherein the second leg portion includes a slide portion having a cavity portion with a trapezoidal cross-section, and wherein the scale plate has a trapezoidal cross-section that is received in the cavity portion of the slide portion.

9. The apparatus according to claim 8, wherein, an identifier indicating the scale for measuring the outer diameter and an identifier indicating the scale for measuring the inner diameter are marked on the slide portion at positions adjacent to one side and another side of the scale plate.

* * * * *